United States Patent [19]

Riebel et al.

[11] 4,329,267

[45] May 11, 1982

[54] PROCESS FOR THE PREPARATION OF ETHYLENE-VINYL ESTER GRAFT POLYMER DISPERSIONS

[75] Inventors: Klaus Riebel; Heinrich Alberts, both of Cologne; Herbert Bartl, Odenthal; Fritz Mietzsch, Cologne; Ulrich Steffen, Dormagen, all of Fed. Rep. of Germany

[73] Assignee: Bayer Aktiengesellschaft, Leverkusen, Fed. Rep. of Germany

[21] Appl. No.: 238,996

[22] Filed: Feb. 27, 1981

[30] Foreign Application Priority Data

Mar. 7, 1980 [DE] Fed. Rep. of Germany ....... 3008748

[51] Int. Cl.$^3$ ............................................. C08L 00/00
[52] U.S. Cl. .................................... 523/323; 526/331; 264/9; 523/335; 528/496; 528/458
[58] Field of Search .................. 260/29.6 R, 29.6 PM; 526/331; 264/9

[56] References Cited

U.S. PATENT DOCUMENTS

| | | | |
|---|---|---|---|
| 2,703,794 | 3/1955 | Roedel | 260/87.3 |
| 3,115,485 | 12/1963 | Bartl et al. | 260/87.3 |
| 3,510,464 | 5/1970 | Sato | 260/87.3 |
| 3,532,658 | 10/1970 | Gintz | 260/29.6 |
| 3,661,827 | 5/1972 | Taft | 260/29.6 MN |
| 3,692,723 | 9/1972 | Kasagi et al. | 260/29.6 E |
| 3,983,096 | 9/1976 | Segalini | 526/64 |
| 4,200,708 | 4/1980 | McClain | 525/62 |

OTHER PUBLICATIONS

F. Daniels, "Outlines of Physical Chemistry", John Wiley and Sons, Inc., New York, 1948, pp. 526–527.

*Primary Examiner*—Joseph L. Schofer
*Assistant Examiner*—Bernard Lipman
*Attorney, Agent, or Firm*—Connolly and Hutz

[57] ABSTRACT

A process for the preparation of dispersions of optionally cross-linked ethylene-vinyl ester graft polymers wherein an ethylene-vinyl ester copolymer is used as graft substrate and a vinyl ester of a $C_1$–$C_{18}$ carboxylic acid and/or a $C_1$–$C_{10}$-alkyl ester of acrylic and/or methacrylic acid are used as a graft monomer which is polymerized, optionally together with a cross-linking agent having two or more C—C double bonds, in organic solution until at least 25% by weight of the graft monomer has been reacted, the reaction product is converted into a stable finely divided dispersion by the addition of a precipitating agent under the action of shearing forces and polymerisation is completed before, during or after the formation of the dispersion.

7 Claims, No Drawings

PROCESS FOR THE PREPARATION OF ETHYLENE-VINYL ESTER GRAFT POLYMER DISPERSIONS

This invention relates to a process for the preparation of ethylene-vinyl ester graft copolymer dispersions by which the graft polymers prepared in solution are directly converted into stable dispersions.

It is known to convert ethylene copolymers from their solutions into finely divided dispersions. For example, in a process described in German Auslegeschrift No. 1,237,311 ethylene-vinyl ester copolymers are dispersed in water from their solution in tertiary butanol or mixtures of tertiary butanol, optionally with vinyl esters and an organic, water-immiscible solvent boiling above 50° C., using a combination of anionic emulsifiers and non-ionic dispersing agents, and the solvent is removed by distillation from the emulsion obtained. Although this process leads to finely divided ethylene-vinyl ester copolymer dispersions, it requires the addition of special emulsifying and dispersing agents which are frequently undesirable and often cause foaming in the subsequent process of distillation to remove the solvent.

It has now been found that finely divided, stable dispersions of ethylene-vinyl ester graft polymers are obtained without the aid of such emulsifiers and dispersing agents and without the addition of water-immiscible solvents if, in the preparation of the graft polymers in organic solution, a precipitating agent for the reaction products is added under the action of shearing forces, e.g. with stirring, when at least 25% by weight of the graft monomers have been reacted. The precipitating agent is generally added when conversion of the graft monomers is still incomplete, and polymerisation is then completed either during or after formation of the dispersion although graft polymerisation could, of course, first be carried out until the monomers have been polymerised to the required extent, e.g. until all the monomers have been polymerised, before the reaction products are converted into a dispersion.

The present invention provides a process for the preparation of stable, finely divided dispersions of ethylene-vinyl ester graft polymers which may optionally be cross-linked, wherein (A) from 95–25% by weight, preferably from 90–50% by weight, of an ethylene-vinyl ester copolymer having a vinyl ester content of from 25 to 75% by weight, preferably from 35–50% by weight, is used as graft substrate; and (B) from 5–75% by weight, preferably from 10–50% by weight of a vinyl ester of a $C_1$–$C_{18}$ carboxylic acid and/or a $C_1$–$C_{10}$-alkyl ester of acrylic and/or methacrylic acid; and (C) from 0–40% by weight, preferably from 0–20% by weight of a cross-linking agent having two or more C—C double bonds, such that the sum of components (A), (B) and (C) is always 100% by weight, are polymerised in organic solution until at least 25% by weight of component (B) has been reacted, and a precipitating agent is then added under the action of shearing forces, so that the reaction product precipitates and simultaneously is converted into a stable dispersion, and polymerisation is completed before, during or after formation of the dispersion.

The graft substrates used are ethylene-vinyl ester copolymers in which from 25 to 75% by weight, preferably from 35 to 50% by weight of vinyl esters are incorporated by polymerisation. The vinyl esters used may be organic vinyl esters of saturated $C_1$–$C_{18}$ monocarboxylic acids optionally substituted by halogen, in particular by chlorine, for example, vinyl formate, vinyl acetate, vinyl propionate, vinyl chloropropionate, vinyl butyrate, vinyl isobutyrate, vinyl laurate, vinyl myristate, vinyl stearate and vinyl benzoate. Ethylene-vinyl acetate copolymers are preferred.

The ethylene-vinyl ester copolymers are prepared by known methods of high pressure and medium pressure synthesis, optionally in solvents such as tert.-butanol, and may, if desired, be partly or completely saponified. The copolymers generally have Mooney viscosities ML4/100° C., determined according to DIN 53 323, of from 15 to 80, preferably from 20 to 45, and intrinsic viscosities ($\eta$) of from 0.5 to 1.8 dl/g, determined in THF.

Suitable monomers for the graft reactions include the vinyl esters of $C_1$–$C_{18}$-carboxylic acids already mentioned above and/or $C_1$–$C_{10}$-alkyl esters of acrylic and/or methacrylic acid, such as methyl(meth)acrylate, n- or isobutyl (meth)acrylate, ethyl(meth)acrylate, n- or isopropyl(meth)acrylate and 2-ethylhexyl(meth)acrylate. Vinyl acetate is the preferred graft monomer.

The graft reaction is optionally promoted by the addition of up to 10% by weight, preferably from 0.1–10% by weight, based on component B, of so-called "grafting activators". Suitable grafting activators include readily copolymerisable unsaturated monomers, e.g. $C_2$–$C_{18}$-$\alpha$-olefines such as ethylene, propylene and isobutylene, allyl compounds such as diisobutylene, isobutylene diacetate, isobutylene diol, vinyl ethylene carbonate, diallyl carbonate, 1-butene-3,4-diol and 2-methylene-1,3-dihydroxypropane and 2-methylene1,3-diacetoxypropane, (meth)acrylic acid and (meth)acrylamide. Ethylene is a preferred grafting activator.

Suitable cross-linking agents for the preparation of cross-linked graft polymers include, for example, aromatic divinyl compounds, divinyl ethers, divinyl esters of $C_2$–$C_{10}$-dicarboxylic acids, diallyl and triallyl ethers and esters, esters of diols with $\alpha,\beta$-unsaturated $C_3$–$C_{10}$-monocarboxylic acids and unsaturated polyesters. The following are specific examples: Divinylbenzene, butanediol diacrylate, glycol divinylether, divinyladipate, allyl vinyl ether, diallyl fumarate, triallyl cyanurate and trimethylolpropane triallyl ether.

The aliphatic and mixed aliphatic-aromatic polyesters used as cross-linking agents are prepared by known methods of esterification or trans-esterification of mixtures of aliphatic or aromatic dicarboxylic acids or their derivatives such as their anhydrides or esters with aliphatic dialcohols (see Ullmanns Enzyklopädie der technischen Chemie, 14th Volume, Urban und Schwarzenberg, Munich, 1963, page 80 et seq).

Examples of unsaturated dicarboxylic acids and their derivatives preferably used for the preparation of polyesters include maleic acid, maleic acid anhydride and fumaric acid although mesaconic acid, citraconic acid, itaconic acid and chloromaleic acid may also be used. Aromatic dicarboxylic acids and derivatives thereof, such as phthalic acid anhydride, isophthalic acid, terephthalic acid, hexa- and tetrahydrophthalic acid and their anhydrides, endomethylene tetrahydrophthalic acid and its anhydride and saturated dicarboxylic acids and their derivatives, such as succinic acid, succinic acid anhydride, succinic acid esters and chloride, adipic acid and sebacic acid may also be used. Polyesters of maleic acid containing up to 25 mol % of phthalic acid or isophthalic acid, and polyesters of adipic acid containing up to 30 mol % of maleic acid are preferred.

Examples of suitable dihydric alcohols for the preparation of the polyesters include ethylene glycol, propane-1,2-diol, propane-1,3-diol, diethylene glycol, dipropylene glycol, butane1,3-diol, butane-1,4-diol, neopentyl glycol, hexane-1,6-diol and perhydro-bisphenol. Ethylene glycol, propane-1,2-diol, diethylene glycol and dipropylene glycol are preferred.

Higher functional carboxylic acids or alcohols, such as glycerol, 1,1,1-trimethylolpropane, hexanetriol and pentaerythritol are used for branched chain polyesters (see e.g. German Pat. No. 1 105 106 and German Auslegeschrift No. 1 029 147). The molecular weights of the polyesters are within the range of from 800 to 10,000, the OH numbers from 0.1 to 100 and the acid numbers from 0.1 to 80. The residual water contents of the polyesters are generally below 0.1%. Special polyesters, e.g. with a narrow molecular weight distribution, may be used if desired. These may be obtained by the polymerisation of lactones such as $\beta$-propiolactone, $\gamma$-butyrolactone or $\epsilon$-caprolactone or by the copolymerisation of epoxides with cyclic anhydrides (see K. Hamman, Makrom. Chem. 51 (1962) 53 and R. F. Fischer, J. Poly. Sci. 44 (1960) 155).

The polyesters may be used alone or as mixtures with other polyesters or optionally also with polyethers.

Unsaturated polyesters have the advantage over low molecular weight cross-linking agents that they are precipitated with the ethylene-vinyl ester copolymers and therefore result in a high density of cross-linking in the dispersed particles.

Suitable solvents for the process according to the invention include inter alia cycloaliphatic and aromatic, optionally halogenated, hydrocarbons and straight chain or branched chain $C_4$-$C_8$-monohydric alcohols. Preferred solvents for the purpose of this invention are water-miscible solvents such as dimethylformamide or tetrahydrofuran, and particularly tert.-butanol and mixtures of tert.-butanol with up to 25% of its weight of water. The precipitating agents used are generally water or $C_1$-$C_3$ alcohols. The preferred precipitating agent for the process according to this invention is water.

The graft copolymerisation may generally be carried out without the aid of dispersing agents in the process according to the invention since both the ethylene-vinyl ester copolymers and the graft polymers have a dispersing action although dispersing auxiliaries may be used in certain cases.

High molecular weight polymers which are soluble in aromatic vinyl compounds, in unsaturated polyesters or in a mixture of polyesters and aromatic vinyl compounds are particularly effective. Particularly preferred dispersing agents are ethylene-vinyl acetate copolymers having a vinyl acetate content of more than 60% by weight, preferably from 65 to 75% by weight and a Mooney viscosity of at least 15, preferably from 40 to 65 Mooney, determined according to DIN 53 523 (1–4) and polyvinyl acetate.

Polymers of (meth)acrylic acid esters containing from 1 to 24 C-atoms in the alcohol component and their copolymers with vinyl esters of organic monocarboxylic or dicarboxylic acids having from 1 to 18 C-atoms and their saponification products are also suitable dispersing agents.

Graft polymers containing the aforesaid polymers as graft substrate are also very good dispersing agents.

Cellulose derivatives such as methyl cellulose, hydroxyethyl cellulose and cellulose esters, e.g. cellulose acetate, cellulose acetopropionate, cellulose acetobutyrate and nitrocellulose are further suitable dispersing agents.

Copolymers of styrene and acrylic acid, saponified copolymers of styrene and maleic acid anhydride, polyethylene oxides, polyacrylamide and polyacrylic acid may also be mentioned as examples. The dispersing agents are added in quantities of from 0 to 10% by weight, preferably from 0.5 to 2% by weight, based on the total solids content of the dispersion.

After addition of the graft monomers and optionally cross-linking agents and grafting activators, polymerisation is initiated either by irradiation or by initiators which supply radicals. Initiator radicals may also be produced by known Redox systems or by means of UV irradiation or actinic light or accelerated electrons.

Percompounds or azocompounds or highly substituted ethane derivatives which supply radicals, e.g. benzpinacol, may be used as polymerisation catalysts. The following are examples: benzoyl peroxide, tert.-butyl perpivalate, lauroyl peroxide, tert.-butyl peroctoate, tert.-butyl perbenzoate, ditert.butyl peroxide, tert.-butyl perisononanate, diisopropyl percarbonate, dicumyl peroxide, tert.-butyl perneodecanoate, azo-bis-isobutyric acid nitrile and esters of azo-bis-isobutyric acid for example bis-ethylesters.

The polymerisation catalysts may be added to the polymerisation mixture before, during or after the components have been dissolved or mixed. They are preferably introduced into the reaction mixture either together with the monomers or separately after preparation of the homogeneous graft substrate solution.

The polymerisation catalysts are suitably used in a quantity of from 0.001 to 2% by weight, based on the sum of graft substrate and graft monomers although quantities above or below this range may, of course, be used.

Graft polymerisation is carried out at temperatures of from 20° C. to 250° C., preferably within the range of from 50° C. to 150° C., depending on the initiators employed. Pressures of from 1 to 400 bar, preferably from 1 to 25 bar are employed.

Graft polymerization and dispersion according to the invention may be carried out either continuously or batchwise. The graft substrate is dissolved in a solvent or in a mixture of solvent and precipitating agent. Polymerisation is started after the addition of the one or more graft monomers, optionally one or more cross-linking components and possibly grafting activators and in special cases also dispersing agents. When at least 25% by weight of the graft monomers have undergone reaction, a precipitating agent is added whereupon the reaction products are precipitated.

It is advantageous for carrying out the process to add the precipitating agent in a zone or high turbulence. Known apparatus are generally used for preparing the dispersion in a zone of high turbulence, e.g. conventional stirrer vessels. The specific mixing power in an intensively operated stirrer vessel is generally from $10^{-1}$ to $10^{-3}$ Watt/cm$^3$.

Pumps equipped with rotors are considerably more suitable than conventional stirrer vessels, particularly because in such pumps, the dwell time in the zone of high turbulence is strictly limited. A special design of a so-called impeller homogenizer specifically developed for high turbulence is suitable for exceptionally high rates of throughput. Its specific mixing power is approximately 5 to 25 Watt/cm$^3$. It thus combines exceptionally intensive mixing with very short dwell times and is therefore preferably used.

The reaction products precipitated by the process according to the invention are obtained in the form of stable, finely divided dispersions of particles with a homogeneous particle distribution. The particle size varies from 0.1 to 10 μm and is preferably within the range of from 0.2 to 2 μm. The stability in storage is at least 6 months.

The graft polymer dispersions of ethylene and vinyl ester prepared by the process according to the invention are suitable for coating paper and fabrics of all types and for use as binders for non-woven fibre webs of natural or synthetic origin and for use as binders for paints.

The invention is further illustrated by the following Examples. An ethylene/vinyl acetate copolymer (EVA copolymer) having a vinyl acetate content of 45%, a Mooney viscosity of 18 to 25 and an intrinsic viscosity (η) of 1.2 [dl/g] determined in toluene is used. The percentages given are in all cases percentages by weight. The cross-linking agent used is a polyester referred to as polyester A which is prepared from 0.5 mol of butanediol, 0.5 mol of ethylene glycol, 0.7 mol of adipic acid and 0.3 mol of maleic acid and has an OH number of 53, an acid number of 0.8 and a viscosity at 75° C. of 1890 [mPas]. The experiments described in the Examples are carried out in a 12 l or 20 l autoclave equipped with an anchor agitator. The rate of stirring is 250 or 180 revs/min, respectively.

EXAMPLE 1

2000 g of EVA copolymer are dissolved in 6000 g of tert.-butanol and 1000 g of water in a stirrer vessel. 500 g of vinyl acetate are added. After the addition of 5 g of tert.-butyl perpivalate dissolved in 100 g of a 4:1 mixture of tert.-butanol and water, an initial polymerisation is carried out for 30 minutes and 45 g of perpivalate dissolved in 300 g of a 4:1 mixture of tert.-butanol and water and 1500 g of water are then simultaneously pumped into the vessel at a temperature of 80° C. over a period of one hour. A further 1000 g of water are subsequently added and polymerisation is continued until all the initiator has been consumed. A stable, finely divided dispersion having a solids content of ca. 20% is obtained.

EXAMPLE 2

2000 g of EVA copolymer are dissolved in 6000 g of tert.-butanol and 1000 g of water in a stirrer vessel. 1000 g of vinyl acetate are then added. After the addition of 2 g of tert.-butyl-perpivalate, the reaction solution is stirred for one hour at a temperature of 80° C., and 1500 g of water are subsequently added within one hour. A further 1000 g of water are added and polymerisation is continued until the initiator has been completely consumed. A stable, finely divided dispersion having a solid content of ca. 24% is obtained.

EXAMPLE 3

2000 g of EVA copolymer and 100 g of polyester A are dissolved in 6000 g of tert.-butanol in a stirrer vessel. 500 g of vinyl acetate are added. After the addition of 5 g of tert.-butyl perpivalate dissolved in 100 g of a 4:1 mixture of tert.-butanol and water, the reaction solution is stirred for 30 minutes at a temperature of 80° C. 45 g of tert.-butyl perpivalate dissolved in 500 g of a 4:1 mixture of tert.-butanol and water and 2500 g of water are then simultaneously pumped into the stirrer vessel over a period of one hour. A further 1000 g of water are subsequently added and polymerisation is continued until all the initiator has been consumed. A stable, finely divided dispersion having a solid content of ca. 20% is obtained.

EXAMPLE 4

2000 g of EVA copolymer are dissolved in 6000 g of tert.-butanol in a stirrer vessel. 800 g of vinyl acetate and 200 g of n-butylacrylate are added. After the addition of 2 g of tert.-butyl perpivalate, the reaction solution is stirred for 3 hours at a temperature of 80° C., until the initiator has been completely consumed. By the addition of 400 g of water with stirring, the reaction solution is then converted into a stable, finely divided dispersion having a solid content of ca. 25%.

EXAMPLE 5

2000 g of EVA copolymer are dissolved in 2000 g of tert.-butanol in a stirrer vessel. 500 g of vinyl acetate and 1 g of ethylene are added. After the addition of 5 g of dicumyl-peroxide, the reaction mixture is polymerised for 30 minutes, and 15 g of dicumyl peroxide dispersed in 150 g of a 4:1 mixture of tert.-butanol and water and 1500 g of water are then simultaneously forced into the stirrer vessel within a period of 2 hours at a temperature of 150° C. and polymerisation is continued until the initiator has been completely consumed. The stable, finely divided dispersion having a solid content of ca. 40% is obtained.

We claim:

1. A process for preparing a stable, finely divided dispersion of an ethylene-vinyl ester graft polymer which comprises the steps of (1) polymerizing in organic solution a mixture comprising
   (A) 95-25% by weight of an ethylene/vinyl ester copolymer having a vinyl ester content of 25-75% by weight;
   (B) 5-75% by weight of a vinyl ester of a $C_1$-$C_{18}$-carboxylic acid and/or a $C_1$-$C_{10}$-alkyl ester of acrylic acid and/or methacrylic acid; and
   (C) 0-40% by weight of a cross-linking agent having two or more carbon to carbon double bonds until at least 25% by weight of component (B) has been reacted, (2) adding a precipitating agent in the absence of an emulsifying agent and/or dispersing agent while applying a shearing force having a specific mixing power of from $10^{-3}$ to 25 Watt/cm$^3$ to thereby precipitate graft polymer and simultaneously form a stable, finely divided dispersion and (3) completing polymerization of any residual amount of component (B).

2. The process of claim 1 wherein the solvent employed is tert.-butanol or mixtures thereof with up to 25% by weight of water and the precipitating agent employed is water.

3. The process of claim 1 wherein 90-50% by weight of component (A), 10-50% by weight of component (B) and 0-20% by weight of component (C) is polymerized.

4. The process of claim 1 wherein the vinyl ester content of component (A) is 35-50% by weight.

5. The process of claim 1 wherein component (A) is an ethylene/vinyl acetate copolymer and component (B) is vinyl acetate and/or a $C_1$-$C_{10}$-alkyl ester of acrylic acid and/or of methacrylic acid.

6. The process of claim 1 wherein component (C) is an unsaturated polyester.

7. The process of claim 1 wherein a $C_2$-$C_{18}$-α-olefin is employed as grafting activator.

\* \* \* \* \*